…

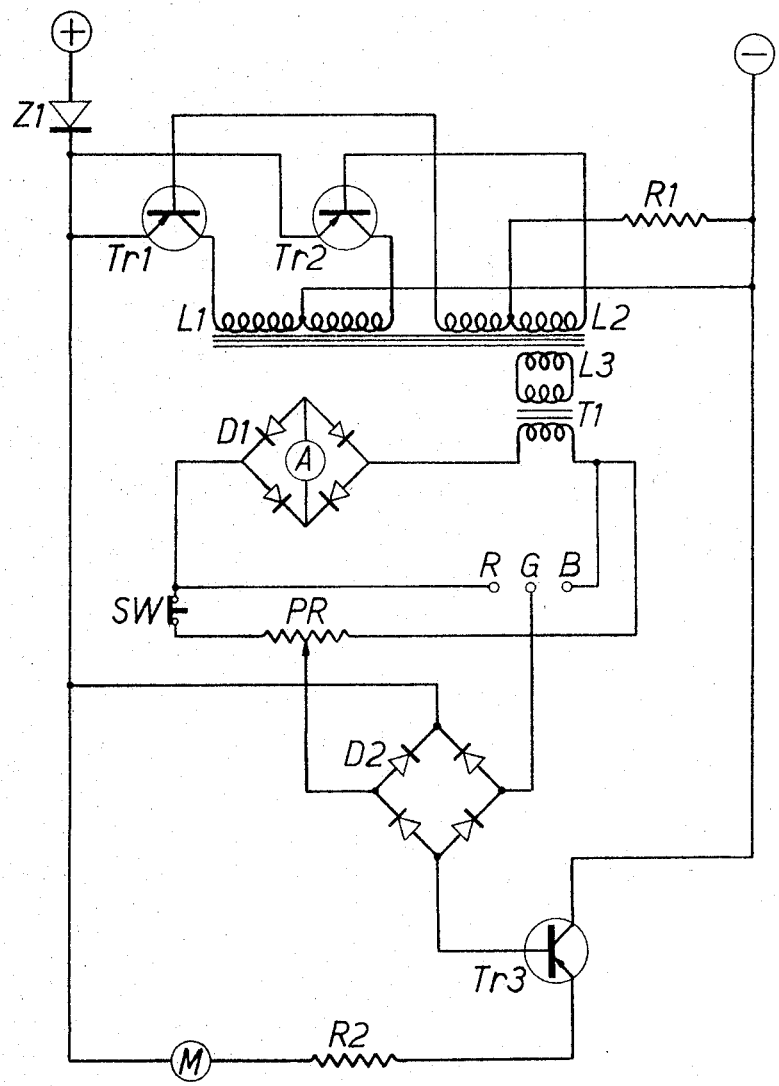

United States Patent Office 3,287,634
Patented Nov. 22, 1966

3,287,634
APPARATUS FOR FINDING FAULTS IN TEMPERATURE DETECTORS INCLUDING TRANSISTOR MEANS HAVING A CURRENT MEASURING DEVICE IN THE EMITTER CIRCUIT
Jack B. Collins, Isleworth, England, assignor of one-half to Wilkinson Sword Limited, and one-half to Graviner Manufacturing Company Limited, both of London, England, both British companies
Filed May 6, 1963, Ser. No. 278,132
Claims priority, application Great Britain, May 8, 1962, 17,569/62
2 Claims. (Cl. 324—52)

This invention relates to electrical testing apparatus. More particularly the invention relates to apparatus for use with temperature detectors of the kind comprising two elongated conductors spaced apart by a material having a substantial temperature coefficient of resistance.

According to the present invention there is provided electrical testing apparatus for finding the approximate location of a leakage path between two conductors of a temperature detector of the kind specified, comprising a current source connected between opposite ends of one of said conductors, a potential divider supplied from said current source and adjustable to provide a selectively variable potential at an output terminal, and current responsive means for determining a current minimum, said current responsive means being connected between the other of said conductors and said output terminal whereby the setting of said potential divider required to give a current minimum is representative of the location of the leakage path.

The invention also provides electrical testing apparatus for use with a temperature detector of the kind specified, and in which when the apparatus is in use the ends of one conductor of the detector are connected to a current source, comprising means for producing from said current source a selectively adjustable potential difference which can be balanced against the potential difference developed at the other conductor due to leakage, current responsive means for determining balance of the two potential differences, a circuit breaker operable for isolating from said current source the means for producing the selectively adjustable potential difference, and further current responsive means for responding to current passing between said ends of the one conductor when said circuit breaker is operated to indicate continuity of circuit.

One construction of electrical testing apparatus in accordance with the invention for finding faults in temperature detectors will now be described, by way of example, with reference to the accompanying circuit diagram of the testing apparatus showing the terminals of the detector to which the apparatus is connected.

This construction of apparatus is designed to enable an operator to determine the approximate location of a leakage path between the inner and outer conductors of a coaxial temperature detector of the kind referred to above, the leakage path having a resistance which is low relative to the normal resistance of the spacing material at the temperature in question. The low resistance path may be the result of localised heating of the detector, or may be a fault condition, for example resulting from the entry of moisture. In practice the detector may consist of a plurality of unit lengths coupled end-to-end.

The apparatus is designed to operate from a direct current supply, for example a 24 volt battery, and has an inverter comprising two transistors $Tr1$ and $Tr2$ whose collectors are connected respectively to opposite ends of a centre-tapped winding L1 wound on a ferromagnetic core (not shown), the centre tap of winding L1 being connected to the negative supply terminal. The bases of the respective transistors $Tr1$ and $Tr2$ are connected to opposite ends of a second centre-tapped winding L2 wound on the same core, the centre tap of winding L2 being connected through a dropping resistor R1 to the same negative supply terminal. The emitters of the transistors $Tr1$, $Tr2$ are connected to the positive terminal of the supply, the supply lead including a Zener diode Z1 for voltage stabilisation. As a result of the regenerative coupling of transistors $Tr1$ and $Tr2$ by windings L1 and L2 wound on the common core, a square wave oscillatory output is developed in an output winding L3 wound on the same core. This square wave output is re-shaped by passage through a coupling transformer T1 whose output supplies an alternating current bridge to be described in greater detail hereafter.

The output from transformer T1 is applied between opposite ends of the centre conductor of the coaxial detector (not shown) by connection of the two ends of the centre conductor to terminals R and B respectively, the outer conductor provided by the sheath of the detector being connected to terminal G. Thus, the two lengths of the centre conductor of the coaxial detector which lie on either side of any leakage path between the centre conductor and the sheath constitute two of the arms of the alternating current bridge and are effectively connected between terminals R and G and G and B respectively. The output from transformer T1 is also applied between opposite ends of a potentiometer PR, the portions of resistor on either side of the potentiometer slider constituting the two balance arms of the bridge. Means for detecting balance of the bridge, which will be described in detail below, is connected between the slider of the potentiometer PR and the sheath of the detector via terminal G.

A normally closed switch SW is included in series with the potentiometer PR so that this part of the bridge may be isolated when it is desired to measure the resistance between the two ends of the centre conductor. For this purpose an ammeter A is connected across one diagonal of a rectifier bridge D1 whose other diagonal is in series with the output from transformer T1. The passage of current through this ammeter A indicates that there is no break in the inner conductor of the detector and the actual meter reading enables an operator to determine that the resistance between the two ends of the centre conductor (together with that of any intermediate couplings where the detector is made up of several unit lengths), is within acceptable limits.

The balance detecting means for the alternating current bridge comprises a transistor $Tr3$, any potential difference between the potential at the potentiometer slider and the potential at terminal G being rectified by a bridge rectifier D2 and applied between the base of transistor $Tr3$ and the positive supply terminal. The emitter of the transistor $Tr3$ is connected to the positive terminal through an emitter load resistor R2 and a milliammeter M.

When the milliammeter M in the emitter circuit shows a minimum reading, the position of the potentiometer slider relative to the ends of the potentiometer PR corresponds to the position along the inner conductor, relative to the ends of the detector, at which any short circuit or low resistance leakage path exists.

The resistance of the leak can be obtained approximately, after location of the leak, by direct measurement of the potential difference between the potentiometer slider and terminal G.

It will be understood that the potentiometer can be calibrated in distance from the ends, interchangeable scales being provided for different lengths of the detector.

The potentiometer PR could, of course, be replaced by a variable auto-wound transformer having the balance detection circuit connected to the contact of the variable transformer.

It will be appreciated that if an alternating current supply is available the inverter circuit supplying the output at the secondary winding of transformer T1 is not required.

If it is only required to detect leakage paths of very low resistance or short circuits, the balance detection means need only be a D.C. meter in a rectifier bridge circuit and transistor $Tr3$ is not required. With the transistor detector circuit shown, it is possible to detect leaks of the order of 100 kilohms.

The connection of the milliammeter M and load resistor R2 in the emitter circuit of transistor $Tr3$, as shown, rather than connection of the meter M in the collector circuit, ensures sufficient sensitivity to locate leakage paths of relatively high resistance whilst avoiding the use of a meter having several current ranges. This is because at low signal levels the transistor $Tr3$ has maximum gain, but as the emitter current increases the emitter of transistor $Tr3$ becomes negatively biassed with respect to the base thereby limiting the emitter-collector current. In other words if emitter-collector current is plotted against base-emitter current the resultant curve will show an initial steep portion for low values of base emitter current, with the emitter-collector current increasing sharply with increasing base-emitter current. However, at higher values of base-emitter current the increase in emitter-collector current will be much less so that the curve will flatten out until the limiting value is reached when there will be substantially no increase in emitter-collector current irrespective of the increase in the base-emitter current. The emitter-collector current at low values of base-emitter current gives a sufficient meter reading even when the leakage path to be located in the temperature detector is of relatively high resistance. On the other hand the emitter-collector current is limited to a maximum value as already described, which maximum value is insufficient to damage the meter, so that the meter can operate with only a single current range. In this way there is high sensitivity near balance point and lower sensitivity away from balance, thus avoiding the necessity for range changing.

I claim:
1. In electrical testing apparatus for finding the approximate location of a leakage path between two conductors of an elongated temperature detector in which the conductors are spaced apart by a material having a substantial temperature coefficient of resistance,
   a source of alternating current,
   first current measuring means,
   first, second and third detector-connection terminals, said first terminal being electrically connected to one end of one of said two conductors, said second terminal being electrically connected to an opposite end of said one of the two conductors, and said third terminal being electrically connected to the other one of said two conductors, said source of alternating current and said first current measuring means being electrically connected in series between said first terminal and said second terminal,
   a circuit breaker,
   a potentiometer having a slider arm movable to vary the potential developed at said slider arm, said circuit breaker and said potentiometer being electrically connected in series between said first terminal and said second terminal,
   a rectifier bridge having a pair of alternating current input terminals and a pair of rectified current output terminals, one of said input terminals being connected to said slider arm and the other of said input terminals being connected to said third detector-connection terminal,
   a transistor having a base electrode, an emitter electrode and a collector electrode,
   a unidirectional current supply having first and second supply terminals, said collector electrode being electrically connected to said first supply terminal, said base electrode being electrically connected to one of said rectified current output terminals, the other of said rectified current output terminals being electrically connected to said second supply terminal, second current measuring means,
   and
   a resistor load, said resistor load and said second current measuring means being electrically connected in series between said emitter electrode and said second supply terminal.

2. Apparatus for finding faults in elongated temperature detectors having two conductors spaced apart by a material having a substantial temperature coefficient of resistance, comprising
   a source of electrical current,
   first current measuring means,
   first, second and third detector-connection terminals, said first terminal being electrically connected to one end of one of said two conductors, said second terminal being electrically connected to an opposite end of said one of the two conductors, said third terminal being electrically connected to the other one of said two conductors, and said source of electrical current and said first current measuring means being electrically connected in series between said first terminal and said second terminal,
   a circuit breaker,
   a potentiometer, said circuit breaker and said potentiometer being electrically connected in series between said first terminal and said second terminal, said potentiometer having a slider arm movable to vary the potential developed at said slider arm by passage of current through said potentiometer,
   a transistor having a base electrode, an emitter electrode and a collector electrode,
   a unidirectional current supply having first and second supply terminals, said collector electrode being electrically connected to said first supply terminal, said base electrode being electrically connected to said slider arm, and said emitter electrode being electrically connected to said second supply terminal, and second current measuring means, said current measuring means being connected to said transistor for measuring current therethrough.

References Cited by the Examiner

UNITED STATES PATENTS

| | | | |
|---|---|---|---|
| 754,402 | 3/1904 | Wiseman | 324—52 |
| 2,120,391 | 6/1938 | Butterfield | 324—52 |
| 2,822,519 | 2/1958 | Murphy | 324—66 |
| 2,942,189 | 6/1960 | Shea et al. | 324—133 |
| 2,955,237 | 10/1960 | Wyndham. | |
| 3,040,249 | 6/1962 | Schwarckopf et al. | 324—54 |
| 3,063,008 | 11/1962 | Grady | 324—60 |
| 3,157,870 | 11/1964 | Marino et al. | 324—29.5 X |
| 3,217,244 | 11/1965 | Glover | 324—54 X |

FOREIGN PATENTS 575,495   2/1946   Great Britain.

WALTER L. CARLSON, *Primary Examiner.*
G. R. STRECKER, *Assistant Examiner.*